United States Patent
Hartline et al.

(10) Patent No.: US 6,506,141 B2
(45) Date of Patent: Jan. 14, 2003

(54) TORQUE-BASED SHIFT SCHEDULING DURING TRACTION CONTROL FOR AN AUTOMOTIVE VEHICLE

(75) Inventors: Barbara Anne Hartline, Plymouth, MI (US); Brian Michael O'Neil, Ann Arbor, MI (US); Bradley Dean Riedle, Northville, MI (US); Charles John Bannon, Northville, MI (US); Michelle S. Grytzelius, Canton, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 19 days.

(21) Appl. No.: 09/753,525

(22) Filed: Jan. 3, 2001

(65) Prior Publication Data

US 2002/0086773 A1 Jul. 4, 2002

(51) Int. Cl.[7] .............................................. B60K 41/04
(52) U.S. Cl. ....................................... 477/115; 180/197
(58) Field of Search .......................... 477/115, 97, 110, 477/107, 111; 180/197; 701/1, 101

(56) References Cited

U.S. PATENT DOCUMENTS

| | | | | |
|---|---|---|---|---|
| 5,337,239 A | * | 8/1994 | Okuda | ......................... 477/110 |
| 5,452,207 A | * | 9/1995 | Hrovat et al. | ................... 701/1 |
| 5,547,435 A | | 8/1996 | Grutter et al. | |
| 5,899,830 A | * | 5/1999 | Tabata | ......................... 477/107 |
| 6,007,454 A | * | 12/1999 | Takahira et al. | ............. 180/197 |
| 6,070,118 A | * | 5/2000 | Ohta et al. | ..................... 477/97 |

* cited by examiner

Primary Examiner—Christopher P. Schwartz
Assistant Examiner—Melanie Torres
(74) Attorney, Agent, or Firm—F. G. McKenzie

(57) ABSTRACT

A method for controlling the capacity of friction clutches and brakes in a multiple-ratio vehicle transmission and for simultaneously establishing ratio shift point scheduling to effect a desired vehicle speed at which ratio changes occur while the vehicle is in a traction control mode. The method includes calculating a synthetic throttle setting that is used to establish clutch and brake capacity control and wherein separate ratio shift schedules are used for normal operation and for traction control operation, the engine torque required during operation in the traction control mode determining the vehicle speed at which shifts occur for each gear ratio whereby the shift schedule during operation in the traction control mode can be calibrated independently of the throttle position required for optimum clutch and brake capacity control.

4 Claims, 3 Drawing Sheets

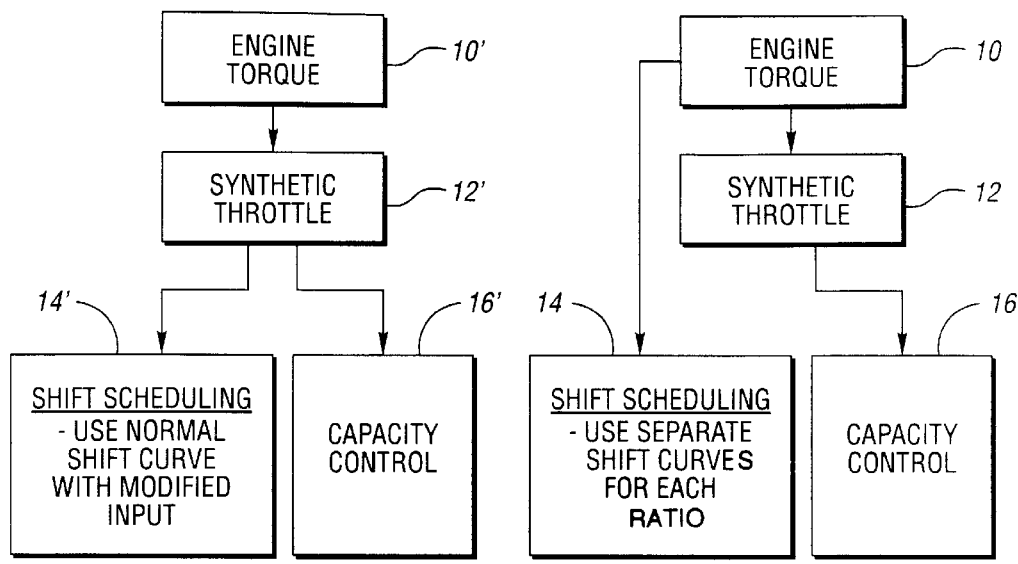
Fig. 1 (PRIOR ART)
Fig. 2
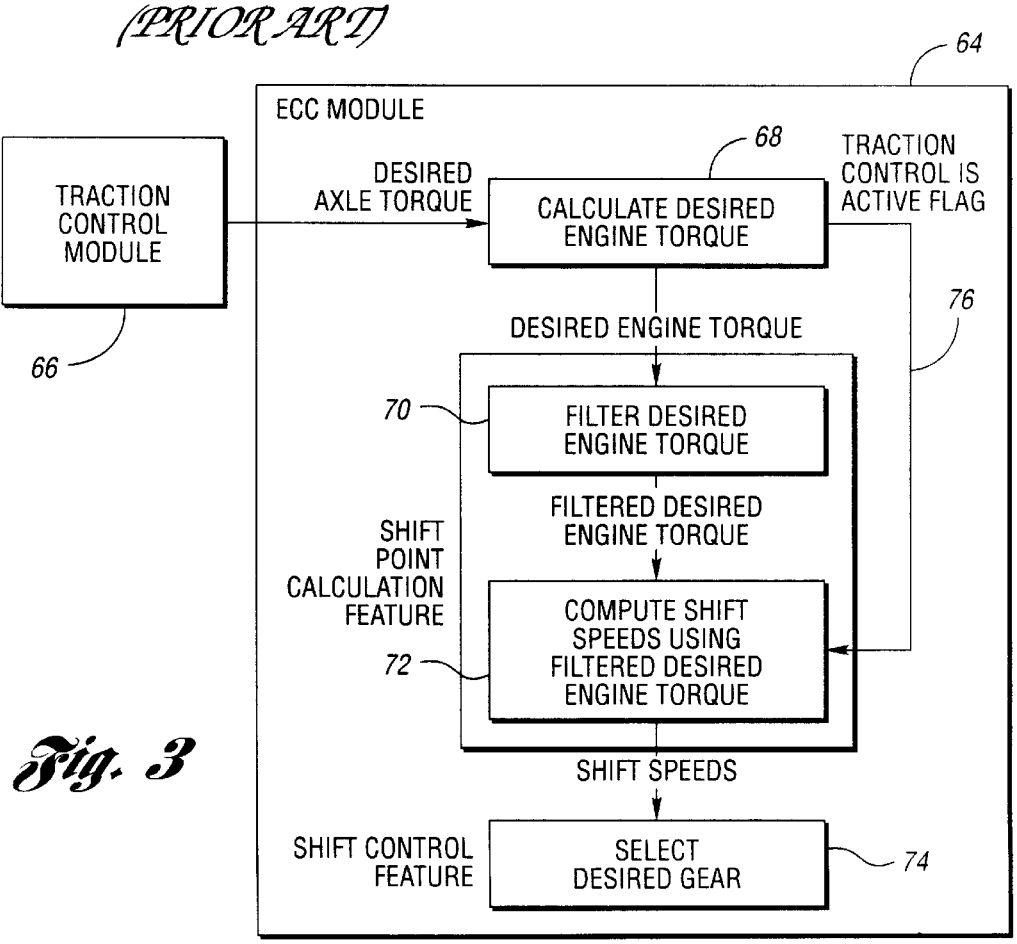
Fig. 3

TORQUE-BASED SHIFT SCHEDULING DURING TRACTION CONTROL FOR AN AUTOMOTIVE VEHICLE

TECHNICAL FIELD

The invention relates to an electronically controlled, automatic, multiple-ratio transmission mechanism for a vehicle with traction controls.

BACKGROUND ART

Controls for multiple-ratio transmissions for automotive vehicles include shift scheduling that depends on engine torque and engine speed. Shift control may rely upon a so-called synthetic throttle position determined by a calibrated relationship between engine torque and engine speed for each actual throttle position. The synthetic throttle position information is used to establish line pressure control to achieve the desired capacity for pressure-actuated transmission clutches and brakes, the clutches and brakes being used to control the torque flow paths through the transmission from the engine to the vehicle traction wheels.

If the vehicle has traction control and the vehicle is operating in the traction control mode, the shift point schedule for the normal operating mode will be affected.

A fundamental principle of the control strategy for the traction control mode requires the transmission to assume the highest gear ratio possible without prematurely exiting from the traction control mode to the normal drive mode. The higher the gear ratio, the lower the torque transmitted to the traction wheels.

Traction controls are designed to sense incipient wheel slip. Incipient wheel slip occurs when the computed wheel speed is slightly above the wheel speed corresponding to the normal drive mode for a given vehicle speed. If incipient slip is detected, the traction control system will reduce engine torque by retarding the spark timing or by modifying the rate of fuel delivery to the engine so that the engine torque output is reduced until the wheel slip is below a wheel slip threshold. Exiting from the traction control mode prematurely will cause hunting of the control system in and out of the traction control mode.

In contrast to the operation of the vehicle in the traction control mode, a fundamental performance principle for normal ratio shifts involves a balance between the optimum vehicle powertrain performance and fuel economy. These differences in the fundamental principles for normal powertrain performance and traction control performance, of necessity, require a compromise in the objectives for normal powertrain operation and for traction control operation.

When the vehicle is not in traction control, the input to the shift schedules located in the memory portion of the powertrain controller is the throttle position. When the vehicle is in traction control, a synthetic throttle position is used as the input for determining the vehicle speed at which shifts occur. Synthetic throttle position is obtained by detecting the true engine torque and engine speed and outputting a predicted throttle setting that would be required to generate that true engine torque. The synthetic throttle setting is used as the input for shift scheduling as well as the input to the capacity control for the powertrain controller. throttle setting is used as the input for shift scheduling as well as the input to the capacity control for the powertrain controller.

Because of the fundamental differences in the principles for calibrating shift schedules when traction control is in place are not consistent with the shift schedules desired when the powertrain is in the normal driving mode, a significant change in synthetic throttle position information is necessary to achieve an acceptable traction control shift schedule curve. This includes a change in the relationship of throttle position to engine torque. Of necessity, this produces a mismatch for purposes of capacity control.

DISCLOSURE OF INVENTION

The invention comprises a method for optimizing both shift scheduling and capacity control by calculating a synthetic throttle setting as an input to capacity control. The commanded traction control torque is used as an input to separate shift schedule curves. Thus, there are separate shift curves for operation of the vehicle in traction control and for normal operation while not in traction control. The separate shift schedule curves thus can be calibrated without having the undesirable effect of commanding the incorrect capacity for capacity control purposes. The separate shift schedules allow for shifts to be based on driver input pedal position during operation of the powertrain in the normal mode and for determining the engine torque required for impending wheel slip in the traction control mode.

During a transition from the traction control mode to the normal shifting mode, there is a natural ramped increase in the requested torque. This is detected at the exit of the traction control event. The increase in the desired torque results in an increase in the vehicle speed at which a given shift occurs. That shift is determined by the separate shift schedule that is characteristic of the normal powertrain operating mode without the traction control in place. The appropriate gear for the surface that the vehicle wheels are on is selected at the exit of the traction control event.

BRIEF DESCRIPTION OF DRAWINGS

FIG. 1 is a schematic representation of a prior art control system for an automotive vehicle driveline with an automatic transmission when the vehicle is capable of operating in the traction control mode;

FIG. 2 is a schematic block diagram showing the improved control system of the invention wherein separate shift curves are used for operation of the powertrain in the normal mode and in the traction control mode;

FIG. 3 is a more detailed schematic diagram of the improved control system of the invention;

BEST MODE FOR CARRYING OUT THE INVENTION

FIG. 1 shows a prior art control system for a vehicle powertrain capable of operating in the traction control mode. Engine torque is developed by the engine as indicated at 10. The engine throttle, together with engine speed, can be converted to the normal expected engine torque using an engine performance table in known fashion. This is expressed as follows:

$$\text{Normal Expected Torque} = \text{table } (Ne, tp).$$

The engine speed data, the throttle position data and the torque value can be manipulated so that the throttle position can be expressed as a table function of engine speed and engine torque. Throttle position thus can be expressed as follows:

$$tp = \text{table } (Ne, tq)$$

When the powertrain is in the traction control mode, the table values of speed and torque for the engine can be used to compute a synthetic throttle value. The synthetic throttle can be expressed as a table value for engine speed and torque as follows:

$$tp.synth = \text{table } (Ne, te).$$

The synthetic throttle value is used in the usual fashion to control friction element capacity of the transmission, as shown at 12 and 16.

Because traction control requires a reduction in the effective engine torque, as explained previously, the torque value used in the above equation for computing synthetic throttle position is not the normal actual engine torque. Because the driver uses a mechanical throttle for obtaining an actual throttle position, a so-called effective throttle position must be computed to obtain a desired engine torque or to obtain a given output shaft desired torque by dividing the output shaft desired torque by the gear ratio for each of the gear ratios of the transmission.

Figure 4:
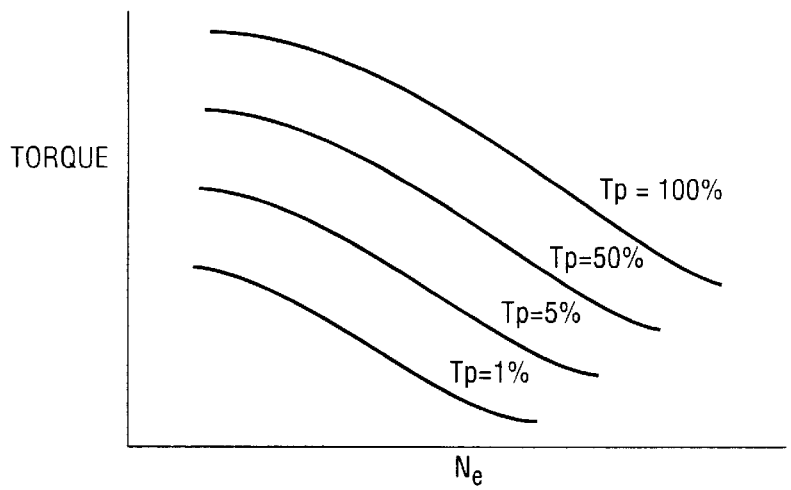
FIG. 4 is a plot showing typical shift points for an automotive vehicle powertrain.

FIG. 4 shows the relationship between torque and engine speed for each throttle position. A separate scheduling curve of the kind indicated in FIG. 4 would be calibrated for upshifts and downshifts when the vehicle is in the normal operating mode and when the vehicle is in the traction control mode.

Figure 5:
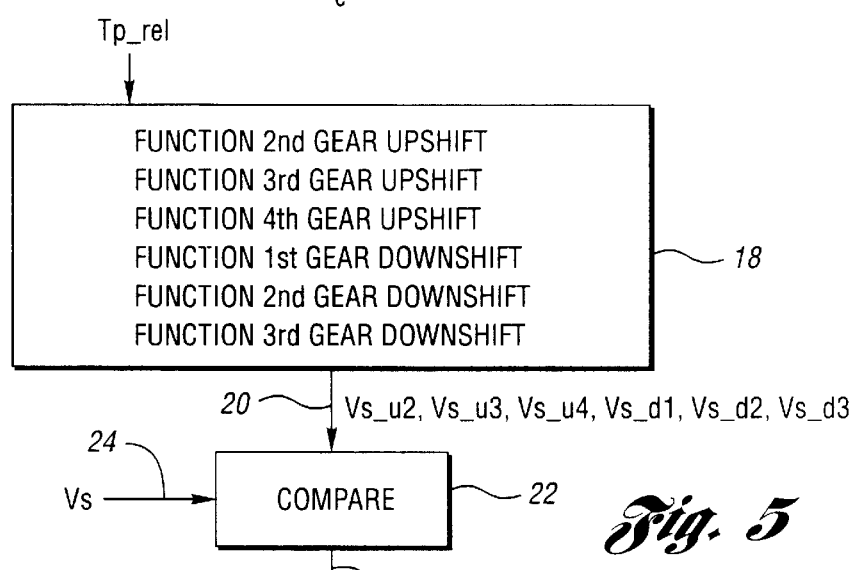
FIG. 5 is a simplified flowchart showing the relationship between relative throttle position, vehicle speed at various shift points, and the gear desired corresponding to each shift point during the normal drive mode.

FIG. 5 shows a partial flow diagram in which throttle position is used as an input for determining the vehicle speed for each upshift and for each downshift when the vehicle is in the normal operating mode. Throttle position is indicated in FIG. 5 as a relative throttle position since it is measured from the zero throttle minimum setting rather than the actual minimum throttle setting.

At action block 18 in FIG. 5, the relative throttle position is used to obtain the vehicle speed at which upshifts to the second, third and fourth gears are obtained, and to obtain the vehicle speeds at which downshifts to the first, the second and third gears are obtained. These are determined by functions stored in memory registers. Using relative throttle position as an input, the vehicle speeds for each upshift and each downshift are obtained as shown at 20. Those values are compared at action block 22 with actual vehicle speed shown at 24. In this way, the desired gear is selected as shown at 26.

The desired gear during normal operation without traction control represents a compromise between best performance and best fuel economy in contrast to the requirements of the traction control mode, where the highest gear possible is commanded for the given road surface without prematurely exiting from the traction control.

Figure 6:
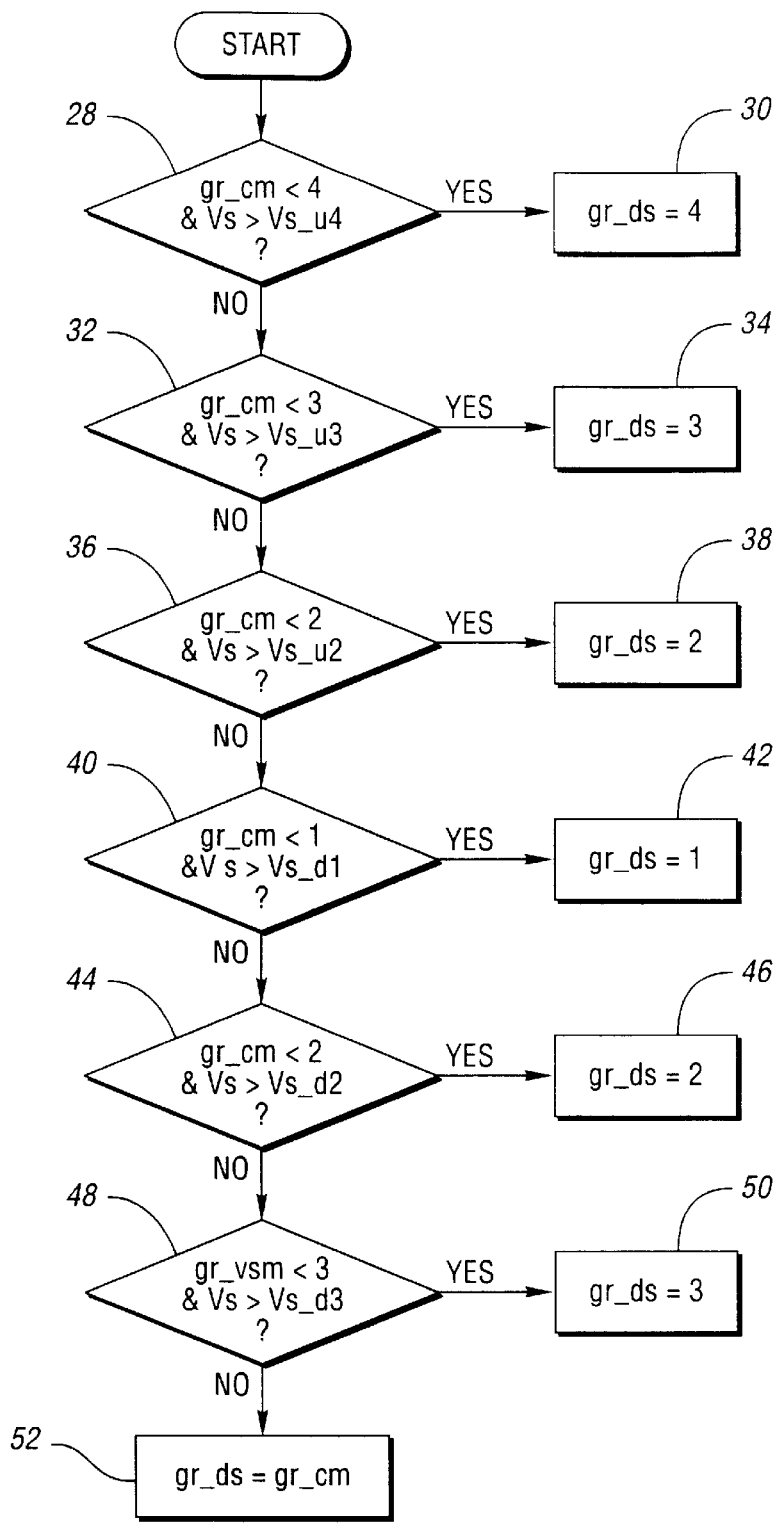
FIG. 6 is a flowchart showing the steps for determining the gear ratio desired for various commanded ratios and vehicle speeds when the vehicle powertrain is in its normal operating mode without traction control.

FIG. 6 shows the complete flowchart for normal operation. When the desired gear is selected using relative throttle position as an input at step 28 in FIG. 6, it is determined whether the commanded gear is less than four and the vehicle speed is greater than the vehicle speed for an upshift to fourth ratio. If the answer is positive, the desired gear is fourth gear as shown at 30. If the answer is negative, a test then is made at 32 as to whether the commanded gear is less than three and the vehicle speed is greater than the vehicle speed for an upshift to third gear. If the answer to the inquiry at 32 is positive, the desired gear is equal to three, as shown at 34.

If the inquiry at 32 is negative, an inquiry is made at step 36 as to whether the commanded gear is less than two and the vehicle speed is greater than the vehicle speed for an upshift to second ratio. If the inquiry at 36 is positive, the desired gear ratio is equal to two, as shown at 38.

If the inquiry at 36 is negative, a test is made at 40 to determine whether the commanded gear is greater than one and the vehicle speed is less than the vehicle speed for a downshift to first ratio. If the inquiry is positive, the desired gear is one as shown at 42.

If the inquiry at 40 is negative, a test is made at 44 as to whether the commanded gear is greater than two, and the vehicle speed is less than the vehicle speed for a downshift to second ratio, as shown at 44. If the inquiry at 44 is positive, the desired gear is two as shown at 46.

If the inquiry at 44 is negative, it is determined at 48 as to whether the commanded gear is greater than three and the vehicle speed is less than the vehicle speed for a downshift to third. If the inquiry at 48 is positive, the desired gear is three as shown at 50. If the inquiry at 48 is negative, the desired gear is equal to the commanded gear as shown at 52.

Figure 7:
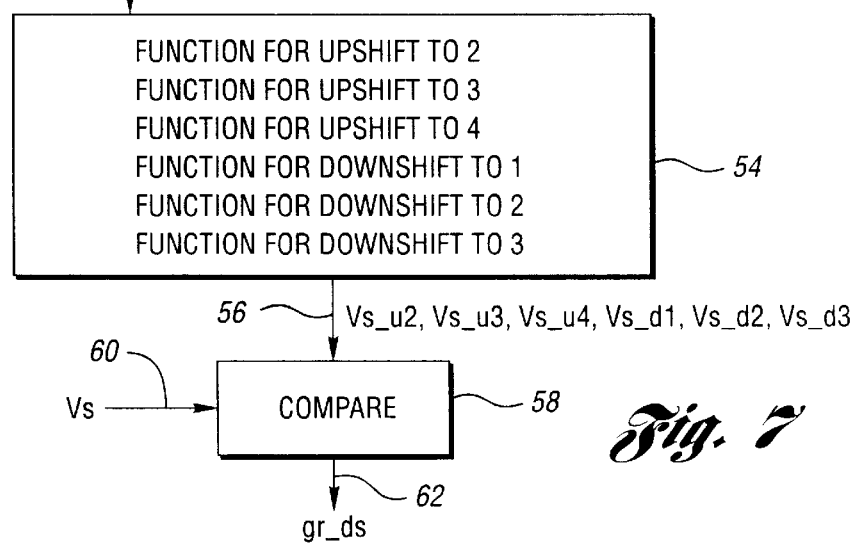
FIG. 7 is a simplified flow diagram corresponding to FIG. 5 for an automotive vehicle powertrain when the traction control mode is in place.

FIG. 7 is a partial flow diagram corresponding to FIG. 5 where the torque of the engine during traction control serves as the input to the controller, where functions are stored for determining the vehicle speed for upshifts to each gear ratio and to downshifts to each gear ratio. This is indicated at 54. Using the functions stored in memory at 54, the vehicle speeds for various upshifts and downshifts are determined as shown at 56. At step 58, the actual vehicle speed at 60 is compared to the vehicle speeds for upshifts and for downshifts for the various gear ratios during traction control. In this way, the desired gear is determined, as shown at 62.

FIG. 3 is an overall summary of the traction control feature. The powertrain electronic control module (i.e., a digital microprocessor) shown at 64 receives the desired actual torque from the traction control module 66 and calculates the desired engine torque at 68. The desired engine torque then is transmitted to filtering circuit 70. The filtered desired engine torque is transferred to action block 72, where the shift speeds are computed using the filtered desired engine torque. The calculated shift speeds are distributed to action block 74, where the desired gear is selected. The shift point calculation feature of action blocks 70 and 72 is notified by a flag signal at 76 that the traction control is active.

Although an embodiment of the invention has been described, modifications to the invention can be made by persons skilled in the art without departing from the scope of the invention. All such modifications and equivalents thereof are intended to be covered by the following claims.

What is claimed is:

1. A method and strategy for controlling ratios of a multiple-ratio transmission for an automotive vehicle having a throttle-controlled engine and traction wheels, the transmission having pressure-operated clutches and brakes for establishing and disestablishing the ratios, the vehicle including traction control wherein torque at the traction wheels is modified when incipient traction wheel slip is detected as engine torque is reduced;

determining a first shift point schedule from a set of shift point schedules as a function of driver commanded torque for each transmission ratio whereby optimum performance and fuel economy is obtained when the vehicle operates without traction control activated;

determining a second shift point schedule from a set of shift point schedules as a function of torque commanded by the traction control for each transmission ratio when the vehicle operates in a traction control mode;

determining a synthetic throttle setting as a function of engine speed and torque;

controlling the operating pressure of the clutches and brakes as a function of synthetic throttle setting;

determining vehicle speed shift points during operation of the vehicle without traction control as determined by the first set of shift point schedules; and determining vehicle speed shift points during operation of the vehicle in a traction control mode as determined by the second set of shift point schedules whereby the highest gear ratio possible is obtained during operation of the vehicle in the traction control mode and the gear ratio for optimum performance and fuel economy is obtained during operation of the vehicle in each gear ratio without traction control.

2. The method and strategy set forth in claim 1 including the step of increasing commanded torque at the traction wheels as the commanded torque for a traction control mode is replaced by a commanded torque for vehicle operation without traction control at the exit of a traction control event as a ratio is selected that is appropriate for a given traction surface for the traction wheels and for a given vehicle acceleration.

3. The method and strategy set forth in claim 1 wherein the steps of determining a first shift point schedule and a second shift point schedule include determining shift point schedules for each ratio of the multiple-ratio transmission.

4. The method and strategy set forth in claim 2 wherein the steps of determining a first shift point schedule and a second shift point schedule include determining shift point schedules for each ratio of the multiple-ratio transmission.

* * * * *